Oct. 18, 1955

F. J. NEWHOUSE ET AL 2,720,930

HITCH-CONTROLLED CIRCUIT OPENING DEVICE
FOR TRACTOR-CONNECTED IMPLEMENTS

Filed July 21, 1953

INVENTORS
FRANK J. NEWHOUSE
BY LESLIE L. KEPKAY

James E. Nilles
ATTORNEY

Oct. 18, 1955

F. J. NEWHOUSE ET AL 2,720,930

HITCH-CONTROLLED CIRCUIT OPENING DEVICE
FOR TRACTOR-CONNECTED IMPLEMENTS

Filed July 21, 1953

INVENTORS
FRANK J. NEWHOUSE
LESLIE L. KEPKAY
BY
James E. Nilles
ATTORNEY

United States Patent Office 2,720,930
Patented Oct. 18, 1955

2,720,930

HITCH-CONTROLLED CIRCUIT OPENING DEVICE FOR TRACTOR-CONNECTED IMPLEMENTS

Frank J. Newhouse and Leslie L. Kepkay, Toronto, Ontario, Canada, assignors to Massey-Harris-Ferguson Limited, a corporation of Canada Application July 21, 1953, Serial No. 369,319

6 Claims. (Cl. 180—14.5)

This invention relates to mounted implements which are carried directly by the tractor. It pertains more specifically to a safety device for such a mounted implement which will prevent injury to the implement or its associated parts when an obstacle is encountered.

It is an object of this invention to provide a safety device of the ignition cut-off type, which is readily returned to its operating position, after it has stopped the tractor when an obstacle is encountered.

It is an object of this invention to provide a novel structure incorporating a safety device of the above mentioned type in which, in order to be returned to the operating position after it has stopped the tractor, it is only necessary to raise the implement and does not require the operator to dismount from his tractor in order to recouple the hitch.

It is an object of this invention to provide a safety device which is highly efficient in operation, easily adjustable as to the force required to trip the mechanism and quickly restored to its operating position after performing the functions for which it was designed.

It is another object of this invention to provide a safety device for mounted implements which is simple in operation, economical to manufacture and easily adaptable to existing, conventional implements.

These and other objects and advantages will appear more fully as the disclosure progresses having reference to the following drawings in which:

Figure 4 is an enlarged side elevational view, in section, of the frame embodying the invention.

Figure 5 is a sectional view taken on line 5—5 of Figure 4.

Figure 6 is a sectional view taken on line 6—6 of Figure 4.

Figure 1:
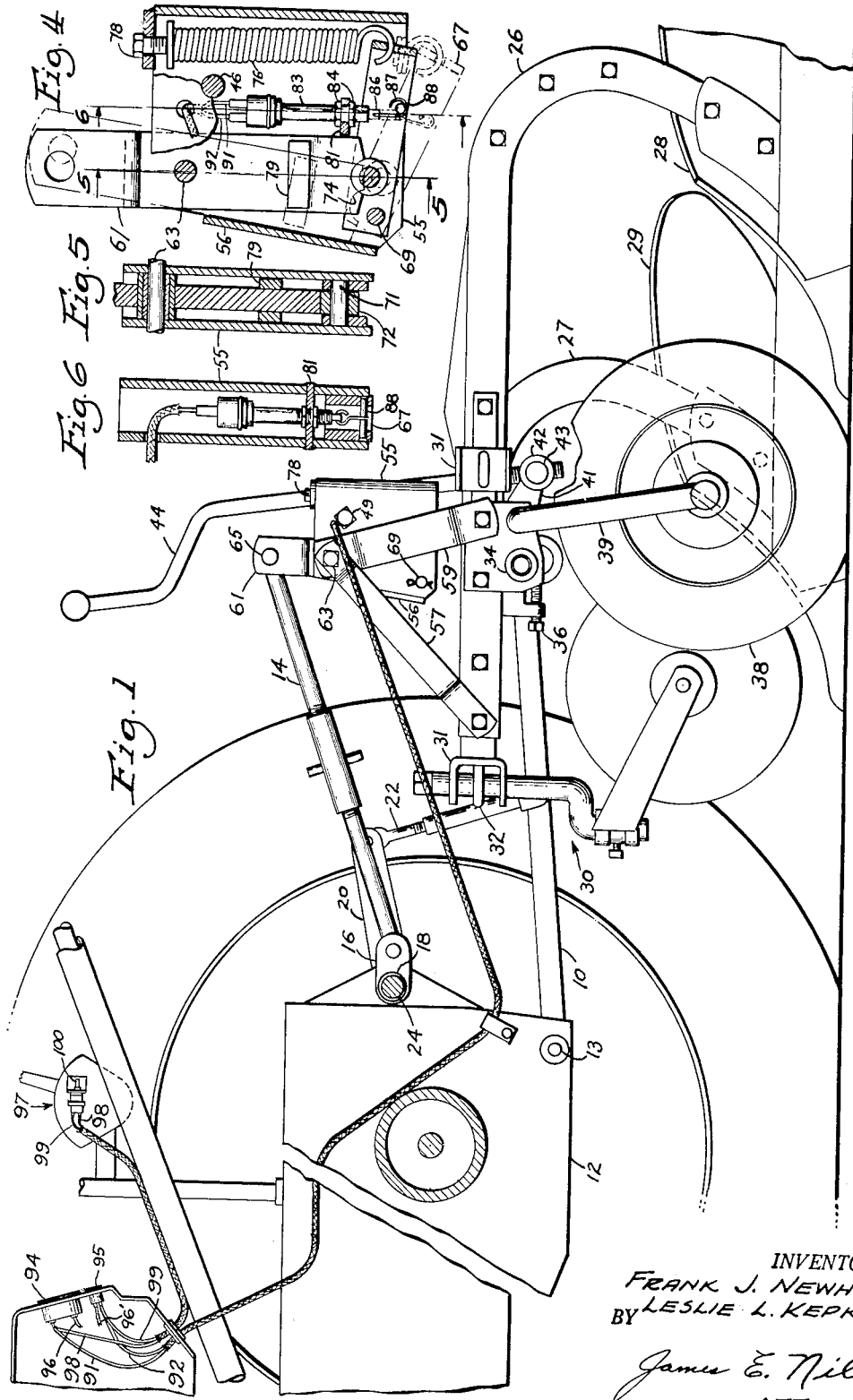
Figure 1 is an elevational view of the safety device as incorporated in a mounted plow, the near tractor wheel being removed as well as part of the lift mechanism. One coulter assembly is also removed for the sake of clarity.
Figure 2:
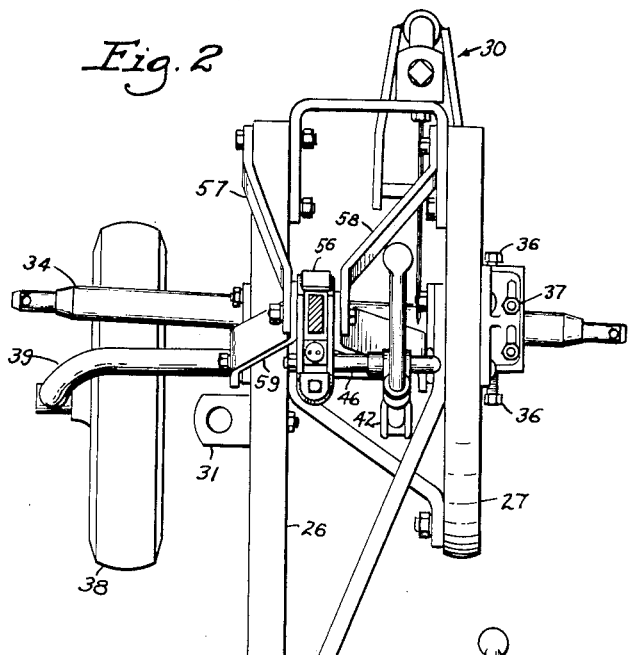
Figure 2 is a plan view of the implement frame with the hitch links, plow bottoms and rear coulter assembly removed for the sake of clarity.

Referring more particularly to the drawings, the embodiment shown utilizes the conventional three-point hitch arrangement in which two laterally spaced, lower hitch links 10 are pivotally attached to the rear end of the tractor housing 12 by means of laterally extending pins 13. The upper hitch link 14, which is adjustable in length for varying the suck of the plow, is pivotally attached at its forward end to the lever 16 rigidly secured to the power lift tube 18. The lower hitch links 10 are positioned vertically by means of the power lift arms 20 through the connecting lift links 22, one of which is adjustable in length for leveling the implement in a transverse direction. The power lift arms 20 are rigidly secured to the power lift shaft 24 on which is rotatably mounted power lift tube 18. The power lift tube is connected to a two-way hydraulic servo-mechanism (not shown) which rotates the tube to vertically position the hitch. A one way stop is provided between the tube 18 and the power lift arms 20, more commonly referred to as a lost motion connection, which allows the implement to "float" independently of the power tube 18 when it has reached a predetermined depth.

The plow frame illustrated comprises the conventional plow beams 26—27 which are rigidly bolted together by suitable braces in the conventional manner and to the lower end of which are connected the plow bottoms 28—29. Each bottom has a coulter assembly 30 (only one shown) adjustably secured to the plow frame by means of the bracket 31 and the large eyebolt 32. The plow frame carries the drawbar 34 to the ends of which are detachably secured the lower hitch links 10. The drawbar 34 is adjustable in a fore and aft direction, for properly aligning the plow with the tractor, by adjusting the bolts 36, after nuts 37 have been loosened.

Figure 3:
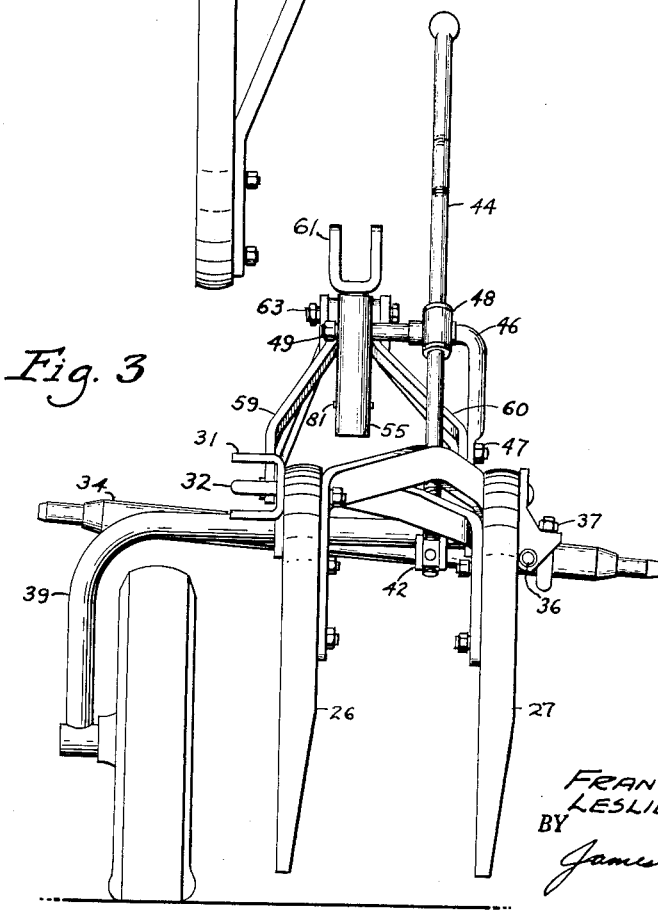
Figure 3 is a rear elevational view of the structure shown in Figure 2, both coulter assemblies removed.

The plowing depth is regulated by the gauge wheel 38 carried by the shaft and axle assembly 39 which is rotatably mounted in the plow frame. An arm 41 (Fig. 1) is rigidly secured to the shaft 39 and has a clevis 42 at its outer end. Rotatably mounted in the clevis is bearing 43 which threadably receives the manually adjustable depth crank 44 which is rotatably mounted to the support shaft 46 by means of the bracket 48. As shown in Fig. 3, the lower end of support shaft 46 is secured to brace 60 by nut and bolt 47. The other end of shaft 46 is threaded and extends through the bracket 55 and secured thereto by nut 49.

Between the major portion of the plow or implement frame and the top link 14 we provide a rigid frame which is fixedly secured to the plow frame and comprises a U-shaped bracket 55 secured to the plow frame by braces 57, 58, 59 and 60. A rockable member 61, in the form of a vertically positioned yoke, is pivotally attached intermediate its length to bracket 55 by means of bolt 63. The rear end of the top link 14 is pivotally attached to the rockable member by means of the quick detachable pin 65. As shown in Fig. 4, U-shaped latch 67 is pivotally mounted at its forward end within the bracket 55 by means of pin 69 extending therethrough. The latch 67 has a pin 71 mounted therein carrying roller 72. Roller 72 is adapted to be held, in normal operating position, in the complementary recess 74 in the lower end of rockable member 61 by means of spring 76 which is hooked to the rear end of latch 67 and adjustably secured by means of the adjusting bolt 78 at the top of bracket 55. To each side of rockable member 61 is fixed a bearing block 79 which guides the rockable member within the bracket 55 and prevents twisting or misalignment between these parts.

Within the bracket 55 is rigidly secured a stop member 81 having an aperture through which extends a cut-off switch 83 and fastened thereto by means of nuts 84. This cut-off or "stop light" switch has a plunger 86 slidably engaged therein having a hook 87 at its lower end which is connected to pin 88 in latch 67. The switch itself is of conventional design and it is sufficient to say that in its normal position (switch-closing) contact between the two wires 91—92 is maintained and the electrical circuit is closed. When the plunger 86 is extended outwardly (switch-opening position) this contact between wires 91—92 is broken and the circuit remains open until plunger 86 is restored to its normal position. The tractor has the conventional ammeter 94 having two terminals, one of which is connected to the battery by wire 96. Wire 96' connects one terminal of the conventional ignition switch 95 with the conventional coil (not shown) of the tractor. An overriding switch 97 normally maintains an open connection between wires 98—99. When the button 100 is pushed, however, this connection is closed and contact between wires 98 and 99 is established. Wires 91 and 98 are secured to the other terminal of the ammeter 94. Wires 92 and 99 are connected to the other terminal of the conventional ignition switch.

In operation, when an obstacle such as a large stone or buried log is encountered by the plow bottom, the frame tends to rotate in a counterclockwise direction about the points of pivotal connection between the rear ends of hitch links 10 and the drawbar 34. This rotative force tends to swing the bolt 63 forwardly and, if of sufficient magnitude to overcome the loading in the spring 76, causes the rockable member 61 to rotate in a clockwise direction about its point of pivotal connection to the upper link 14 until it bears against stop member 56 which is welded to the front side of bracket 55. This movement of the member 61 causes the roller 72 to ride out of the recess 74 forcing the latch 67 to swing downwardly carrying with it plunger 86 and thus breaking the contact in the switch which immediately stops the tractor by cutting off the ignition thereof. It has been found in practice that this device is extremely efficient in immediately stopping forward movement of the tractor when an obstruction as described is encountered and before any injury is done to the implement, hitch or associated parts.

When the operator wishes to proceed, after the tractor has thus been stopped, he simply declutches the tractor, pushes the overriding switch button 100, thus closing the electrical circuit and starting the engine. The tractor may be reversed slightly and the implement hitch then raised through the power derived from the tractor. The weight of the overhanging plow at the rear end causes the frame to rotate in a clockwise direction about the drawbar 34 which, in turn, causes the rockable member 61 to rotate in a counterclockwise direction about bolt 65 until the lower end thereof hits the stop member 81 at which time the spring 76 will urge the latch 67 and its associated roller 72 into contact with the recess 74 in yoke 61 and the plunger 86 returns to circuit closing position within the switch 83.

The implement can then be carried over the obstruction and the operator may proceed, all without dismounting from his tractor in order to reestablish connections in the hitch links or other releasable connections.

We have thus provided an efficient safety device, forming an integral part of the hitch frame which finds great utility in stony areas of the country.

Having thus shown and described the invention, what is desired to be protected by Letters Patent is:

1. In combination with a tractor having an upper and two lower vertically positionable hitch links pivotally attached to the rear thereof; an implement frame adapted to be carried by said lower links; a rigid frame secured to said implement frame, a rockable member swingably mounted to said rigid frame and having said upper link pivotally attached thereto, a latch carried by said rigid frame having means to releasably hold said rockable member in one position, said tractor having an electrical circuit, an ignition cut-off switch connected between said rigid frame and latch, said switch being closed when the rockable member occupies said one position and operable to open the circuit when said latch is moved by movement of the rockable member from said one position due to an excessive draft load on the implement frame.

2. In combination with a tractor having elevationally positionable upper and lower hitch links, an implement frame carried by said lower links, a rigid frame secured to said implement frame, a rockable member pivotally connected to said rigid frame and said upper link, latch means pivoted to said rigid frame for yieldingly holding said rockable member in one position, a cut-off switch connected between said rigid frame and said latch means, said switch being closed when the rockable member occupies said one position and open when said latch is moved by movement of the rockable member from said one position.

3. In combination; a tractor, two lower laterally spaced hitch links, and an upper hitch link trailingly pivoted at the rear end of said tractor, an implement frame pivotally secured to the rear ends of said lower links, a rigid frame secured to said implement frame and extending generally upwardly therefrom, a rockable member pivotally connected intermediate its length to said rigid frame and at its upper end to said upper link, a latch pivoted to said rigid frame and engageable with the lower end of said rockable member, adjustable means to yieldingly hold said latch in engagement with said rockable member, to thereby releasably hold said member in one position under normal draft on the implement; said tractor having an electrical circuit, a cut-off switch in said circuit and connected between said rigid frame and said latch and adapted to open said circuit when said latch is moved by movement of the rockable member from said one position due to an excessive draft on the implement.

4. A device as recited in claim 2 further characterized in that said rockable member has a recess portion at the lower end thereof, a roller mounted on said latch for engagement with said recess portion in said one position.

5. In combination with a tractor having elevationally positionable upper and lower hitch links, an implement frame carried by said lower links, a rigid frame secured to said implement frame, a rockable member pivotally connected to said rigid frame and said upper link, latch means pivoted to said rigid frame for yieldingly holding said rockable member in one position under normal draft load on the implement, an electrical circuit for said tractor, a cut-off switch in said circuit and secured to said rigid frame and controlled by movement of said rockable member from said one position when an excessive draft load is imposed on the implement frame to open said circuit and thereby stop the tractor.

6. A device as recited in claim 5 further characterized in that said rigid frame has a stop means to prevent excessive movement of said rockable member out of said one position whereby the overhanging weight of the implement frame will cause said rockable member to resume its switch-closing position when said hitch links are elevated.

References Cited in the file of this patent
UNITED STATES PATENTS

| | | |
|---|---|---|
| 1,262,456 | Colwell | Apr. 9, 1918 |
| 2,294,188 | Kuntz | Aug. 25, 1942 |
| 2,487,955 | Rodd | Nov. 15, 1949 |
| 2,598,757 | Brunsell | June 3, 1952 |
| 2,701,508 | Richey | Feb. 8, 1955 |
| 2,704,020 | Wilson | Mar. 15, 1955 |

FOREIGN PATENTS

| | | |
|---|---|---|
| 73,434 | Denmark | Nov. 26, 1951 |
| 80,849 | Norway | Oct. 13, 1952 |
| 568,928 | Great Britain | Apr. 26, 1945 |